Sept. 25, 1962 R. FAGEL 3,055,448
DRIVING AXLES FOR ELECTRICAL ROAD VEHICLES
Filed Nov. 10, 1960 4 Sheets-Sheet 1

INVENTOR
Roger FAGEL
BY
ATTORNEYS

Sept. 25, 1962 R. FAGEL 3,055,448
DRIVING AXLES FOR ELECTRICAL ROAD VEHICLES
Filed Nov. 10, 1960 4 Sheets-Sheet 2

INVENTOR
Roger FAGEL
BY
ATTORNEYS

Sept. 25, 1962 R. FAGEL 3,055,448
DRIVING AXLES FOR ELECTRICAL ROAD VEHICLES
Filed Nov. 10, 1960 4 Sheets-Sheet 3

INVENTOR
Roger FAGEL
BY
ATTORNEYS

Sept. 25, 1962   R. FAGEL   3,055,448
DRIVING AXLES FOR ELECTRICAL ROAD VEHICLES
Filed Nov. 10, 1960   4 Sheets-Sheet 4

INVENTOR
Roger FAGEL
BY
ATTORNEYS

United States Patent Office 3,055,448
Patented Sept. 25, 1962

3,055,448
DRIVING AXLES FOR ELECTRICAL ROAD VEHICLES
Roger Fagel, Marcinelle, Belgium, assignor to Ateliers de Constructions Electriques de Charleroi, Brussels, Belgium
Filed Nov. 10, 1960, Ser. No. 68,462
Claims priority, application France Nov. 13, 1959
1 Claim. (Cl. 180—10)

The present invention relates to driving axles for electrical road vehicles, and more particularly for diesel-electric motor coaches, having wheels driven by independent electric motors.

The improved driving axle presents the advantage of great facility of assembling and dismantling its different elements and the components forming the latter, as well as very ready access to the parts which have to be periodically inspected and maintained.

The improved axle comprises a tubular cross-member having at each end a cylindrical collar, the axis of which is arranged above and parallel to the axis of the cross-member, said collar surrounding the carcase of a direct-current electric motor equipped with a double reduction gearing of planetary gear type, the gearing being accommodated within the driving wheel.

The motor-gearing assembly is fixed in the collar by a single key tangential to the motor carcase and perpendicular to its axis. The motor terminals are preferably formed by two contact members electrically connected with connectors secured to the axle and leading through the interior of the cross-member to a junction box fixed to the latter, said cross-member also carrying the means for producing braking forces transmitted to the brakes mechanisms by rods arranged in the interior of the cross-member.

The two sets of planetary speed-reduction gearings comprise stationary internally toothed rings fitted into one another by means of an intermediate grooved ring, enabling the planetary gearings to be readily dismantled by outward movement through the centre of the wheel, while the latter remains in place.

Other features of the invention will hereinafter appear from the following description given with reference to the accompanying drawings, in which.

Figure 1:
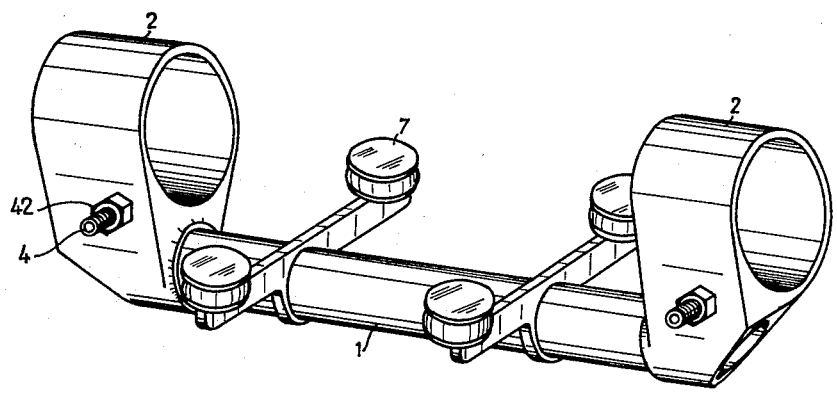
FIG. 1 represents the bridge portion of the improved driving axle.

The bridge portion of the axle, as shown in FIG. 1, comprises a tubular cross-member 1 with brackets on which air cushions 7 are fixed for pneumatic suspension of the main frame and body of the vehicle.

Figure 2:
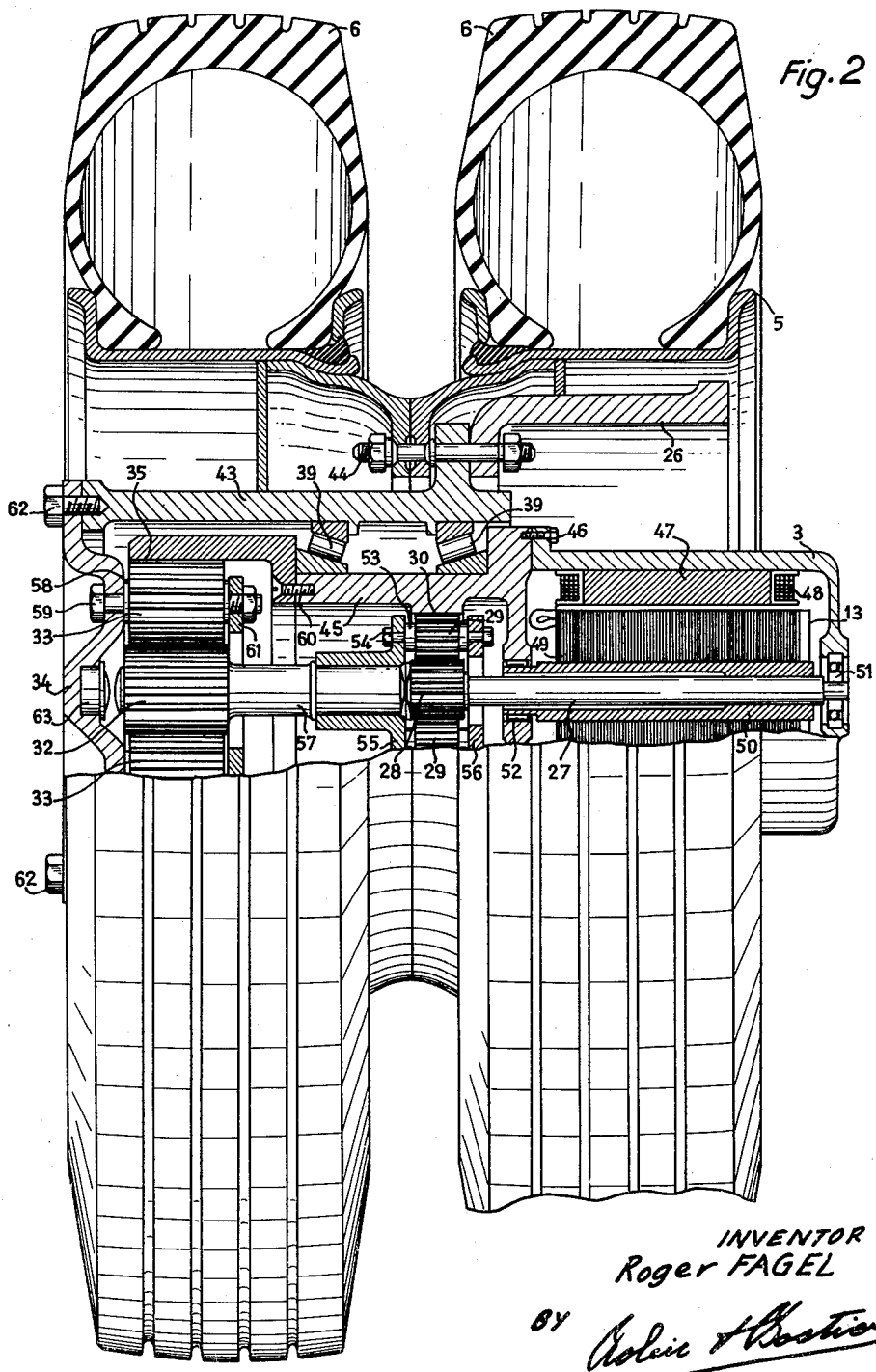
FIG. 2 is a part sectional elevation of a twin-tired driving wheel to be associated with the portion of the axle shown in FIG. 1.

The cross-member 1 is equipped at each extremity with a collar 2, fixed for example by welding, the bore of which is adapted to receive the motor carcase and gearing assembly carrying the wheel. This carcase, designated by the reference 3 in FIG. 2, is fixed by means of a single key 4, tangential to the carcase and perpendicular to its axis, the key being locked in place by a nut 42. The carcase is secured to a ring 45, which takes the place of the usual stub axle on which a wheel revolves. The wheel has its rim 5 equipped with twin pneumatic tire 6 and is fixed upon a hollow hub 43 by means of bolts as at 44, these bolts serving at the same time to secure the brake drum 26 upon the hub which revolves upon the ring 45, by means for example of roller bearings 39.

The ring 45 is internally toothed as part of a planetary gearing, and secured to the motor carcase 3, for example by screws 46. The direct-current motor comprises a stator 47 equipped with field windings 48, and a rotor 49 provided with a commutator 13, the latter being preferably of radial type. The commutator brushes and the motor connections are omitted from the drawing for the sake of clarity.

The rotor 49 is keyed upon a sleeve 50 in the interior of which there is keyed one end of a shaft 27, the extremity of which is mounted in a ball bearing 51 fixed to the carcase 3.

The sleeve 50 is carried at its other end by a bearing 52 inside the internally toothed ring 45. As seen in FIG. 2, the shaft 27 is fitted only at one end in the sleeve 50 and it can bend inside the latter for the greater part of its length, being thus able to float to a small extent. The free end of the shaft 27 carries a pinion 28 around which there are mounted in mesh with it planetary pinions such as 29, for example three in number.

These pinions 29 are spaced symmetrically around the sun pinion 28 and they are rotatable upon axles 53 fixed for example by means of bolts 54, upon a planet-carrier consisting of a plate 55 and a disc 56.

The planetary pinions 29 mesh on the other side with the internal teeth 30 of the ring 45, which will cause the plate 55 to revolve with a reduction of speed in relation to that of the shaft 27.

The plate 55 is keyed on the end of a shaft 57, floating quite freely, the other end of this shaft carrying a sun pinion 32 which meshes with planetary pinions, such as 33. The latter are for example three in number, being spaced symmetrically around the pinion 32.

The planetary pinions 33 revolve on axles 58, fixed for example by bolts such as 59 upon a second planet-carrier consisting of an outer plate 34 and a disc 61.

The plate 34 is fixed, for example by screws such as 62, to the hub 43 on which the wheel is detachably mounted. An end stop 63 fixed inside the plate 34 limits the lateral movement of the shaft 57.

The planetary pinions 33 mesh on the other side with the teeth of another internally toothed ring 35 fixed to the ring 45, for example by means of screws such as 60.

The pinion carrier for the pinions 33 is thus driven with a reduction of speed in relation to that of the shaft 57, and as it is secured directly to the wheel hub the latter is driven at this reduced speed.

Figure 3:
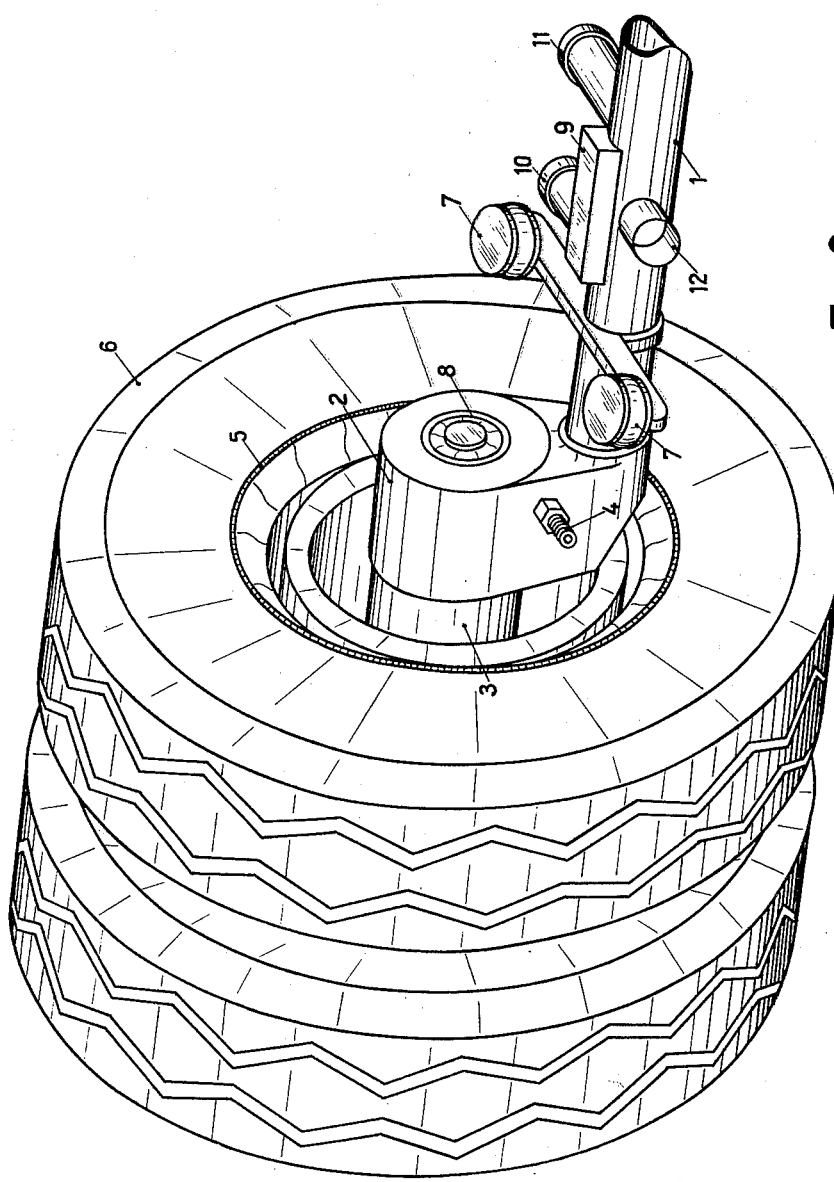
FIG. 3 is a partial view in perspective of the improved driving axle and one of the road wheels.

FIG. 3 shows in perspective a partial view of the complete axle, with the main elements seen in FIGS. 1 and 2, bearing the same references.

As seen in FIG. 3, the cross-member 1 carries also a junction box 9 for the electrical connections of the motor, and two cylinders 10 and 11, for example hydraulic, for operating the vehicle brakes by means of rods located inside the cross-member 1. One of the cylinders serves for normal braking, and the other for emergency or auxiliary braking.

An opening 12, normally closed by a cover (not shown) affords access to the brake-operating rods inside the cross-member. The collar 2 enclosing the motor carcase 3 is closed on the inboard end by a cover-plate 8, the removal of which affords access to the commutator of the motor.

Figure 4:
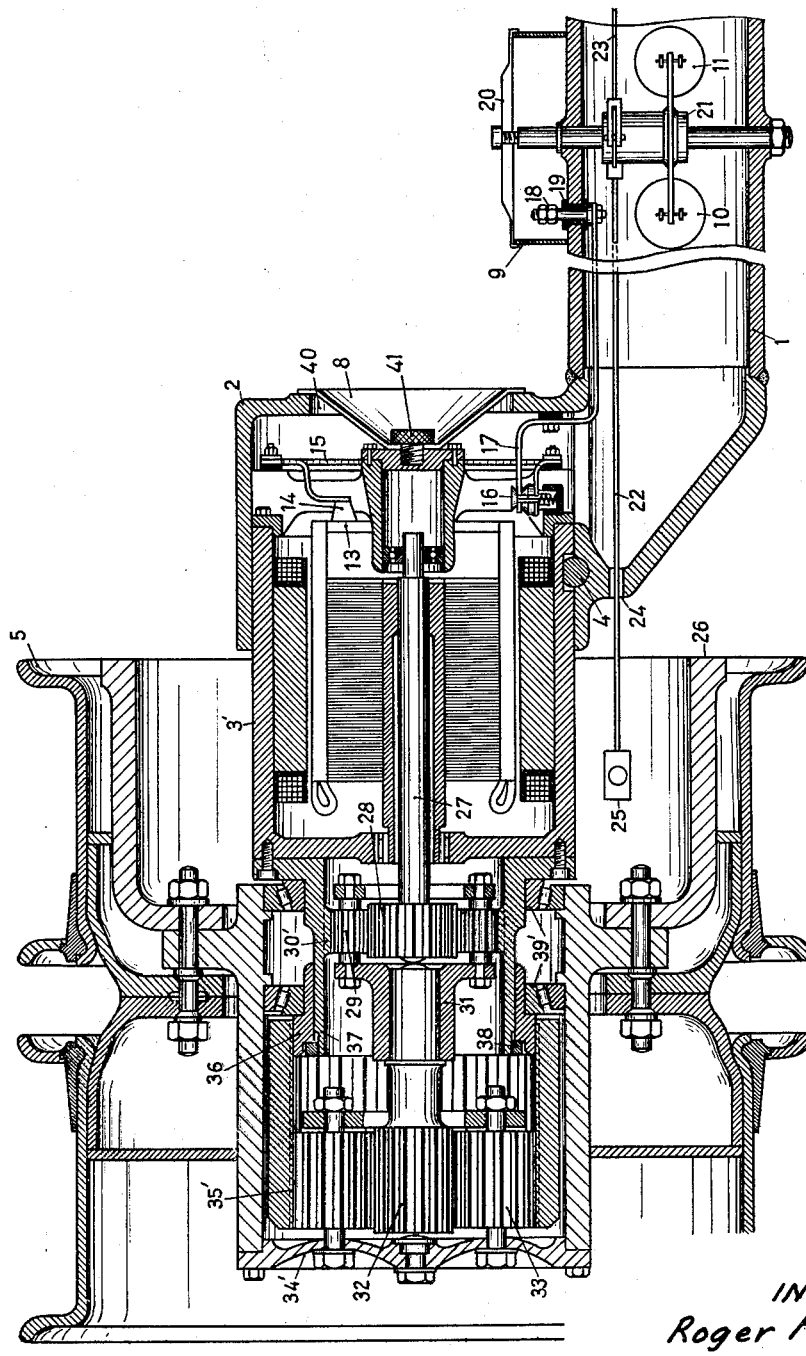
FIG. 4 is a more detailed sectional elevation of one end of the axle, with the wheel-hub and motor-gearing assembly.

FIG. 4 represents a longitudinal section of the improved axle, showing details not represented in the other figures; the speed-reduction gearing here shown is slightly modified, the fixed internally toothed rings of the two sets of planetary gearing being fitted to one another by means of an intermediate splined or grooved ring 36, which facilitates dismantling the assembly.

As shown, FIG. 4, the radial commutator 13 of the motor is fitted with brushes such as 14, which are connected by means of connectors 15 to contact terminals 16 mounted on the motor carcase and insulated therefrom. The field magnets of the motor are likewise connected to similar contact terminals, which are omitted for greater clarity. The terminal members 16 are in spring engagement with the ends of bars 17 fixed in the interior of the collar 2, with which they make contact during the introduction of the motor into the collar 2. The terminal members 16 and the co-operating ends of the bars 17 may be constructed in any suitable manner as required. For example, as seen in FIG. 4, the members 16 may comprise pairs of coned copper discs, pressed against one another by a spring, and between which the flat forked extremities of the bars 17 engage automatically as they are introduced.

The bars 17 lead through the interior of the cross-member 1 to terminals 18, only one of which is shown, fixed through the wall of the tubular cross-member 1, by way of insulators 19.

These terminals are protected by the box 9 fixed to the cross-member 1 and closed by a hood 20. The cross-member contains at its middle portion a linkage system 21 which converts the forces given by the brake cylinders 10 and 11 into tensile forces upon rods 22 and 23 located inside the cross-member 1 and passing out through holes 24 to engage the means 25 for operating the brake shoes in the interior of the brake drums 26.

The internally toothed ring 35' of the second reduction gearing is secured to the corresponding ring 30' of the first reduction gearing by the intermediary of the ring 36, the latter being provided with external grooves which engage with the internal teeth of the ring 35', and internal grooves which engage with corresponding grooves or splines formed upon the exterior of the ring 30'. A ring nut 38, screwed on the end 37 of the ring 30', allows of regulating the position of the ring 36, which determines the clearance of the roller bearings 39' upon which the wheel 5 revolves. Once this adjustment has been made, the ring nut 38 is locked by any suitable means.

It will be seen that by removing the cover 34' of the reduction gearing, there are at the same time removed the outer planet pinions 33, after which it is possible to unscrew the ring nut 38 and the grooved ring 36 which is slidably mounted in the corresponding bearing 39' and can be easily removed together with the toothed ring 35'. The sun pinion 32 together with the sun gears 29 can also be readily extracted. Thus the whole reduction gearing can be dismantled without removing the road wheel.

The collar 2 is also shown in FIG. 4 as provided with an opening 40 normally closed by the cover 8, the latter being fixed to one end of the motor bearing-housing by means of a milled knob 41. This arrangement affords ready access to the motor commutator for inspection and maintenance, particularly the replacement of the brushes 14. For this purpose, a door will be provided in the adjacent wall of the vehicle frame or body, allowing the cover 8 to be removed from the interior of the vehicle.

What I claim and desire to secure by Letters Patent is:

A road vehicle driving axle in which each wheel is driven by an electric motor equipped with a double reduction planetary gearing and supported at the ends of a tubular cross-member, comprising at each end of the tubular member a collar provided to fit the housing of the motor, a single key to tangentially fix said motor to said collar, fixed electrical contacts in said collar, electrical contacts on the motor to plug in said fixed electrical contacts, a first internally toothed ring, secured to the housing of the motor, for the first planetary gearing, externally supporting a bearing of the wheel, this first internally toothed ring having an extended cylindrical portion externally grooved, a second cylindrical internally toothed ring for the second planetary gearing, an intermediate ring supporting a second bearing of the wheel, externally grooved to fit the teeth of said second internally toothed ring and internally grooved to fit the grooves of said extended cylindrical portion of said first toothed ring, a ring nut screwed on the end of said cylindrical portion for securing said intermediate ring and for adjusting the position of said second bearing, and means to lock said ring nut.

References Cited in the file of this patent
UNITED STATES PATENTS

| | | |
|---|---|---|
| 812,118 | Denis | Feb. 6, 1906 |
| 1,570,941 | Carroll | Jan. 26, 1926 |
| 2,529,330 | Double | Nov. 7, 1950 |
| 2,581,551 | Myrmirides | Jan. 8, 1952 |
| 2,726,726 | LeTourneau | Dec. 13, 1955 |
| 2,941,423 | Armington et al. | June 21, 1960 |